Nov. 7, 1950 P. E. VOLZ 2,528,624

AUTOMATIC OPERATION AND SELECTIVE CALLING SYSTEM

Filed March 19, 1947 2 Sheets-Sheet 1

INVENTOR
Philip E. Volz
BY Ostrolenk & Faber
ATTORNEYS

AUTOMATIC OPERATION AND SELECTIVE CALLING SYSTEM

Filed March 19, 1947 · 2 Sheets-Sheet 2

INVENTOR
Philip E. Volz
BY
Ostrolenk & Faber
ATTORNEYS

Patented Nov. 7, 1950 2,528,624

UNITED STATES PATENT OFFICE 2,528,624

AUTOMATIC OPERATION AND SELECTIVE CALLING SYSTEM

Philip E. Volz, Orange, N. J., assignor, by mesne assignments, to Pierce Company, Providence, R. I.

Application March 19, 1947, Serial No. 735,753

6 Claims. (Cl. 178—3)

My invention relates to novel apparatus for and methods of selective calling between communication points having a communication transmission system, such as a common line or the same radio frequency channel and more particularly relates to a novel system for facsimile transmission between a plurality of communication points.

In the transmission of facsimile, the image to be transmitted is usually mounted on a scanner, and the image to be received is recorded on a sheet mounted on a recorder. It is desirable in such systems that the operator be relieved of as much technical operations as possible and that the transmission be made simple and automatic. Thus, once the operator desires to transmit, he should be in a position after selecting the station with which he desires to communicate, to set his equipment for automatically taking control of a transmission channel or line for the purpose of transmitting and at the end of the transmission period releasing the line for use by others along the communication channel.

Accordingly, an object of my invention is to provide a novel transmission system in which an operator may automatically set apparatus for taking control of a line which is free for transmission and select one or more communication points for the reception and automatically give up control of the line on the termination of the transmission; and in which the operator cannot take control of a line which is already in operation.

Figure 1:
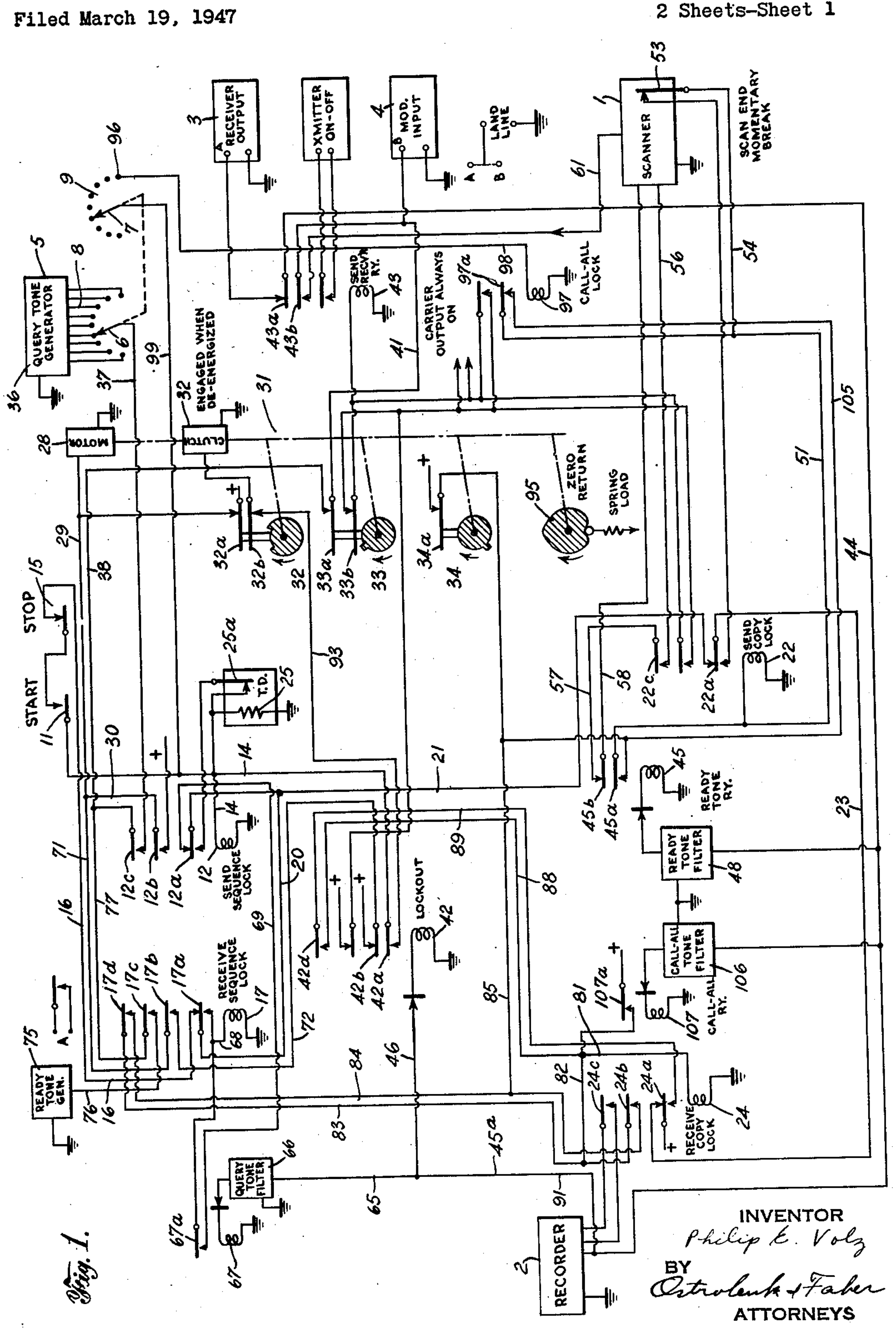

Other objects of my invention will be apparent from the detailed description of the drawings which follow in connection with the drawing in which Figure 1 shows a circuit diagram of my novel apparatus at one of the communication points, it being understood that similar apparatus is located at each of the other transmission points.

Figure 2:
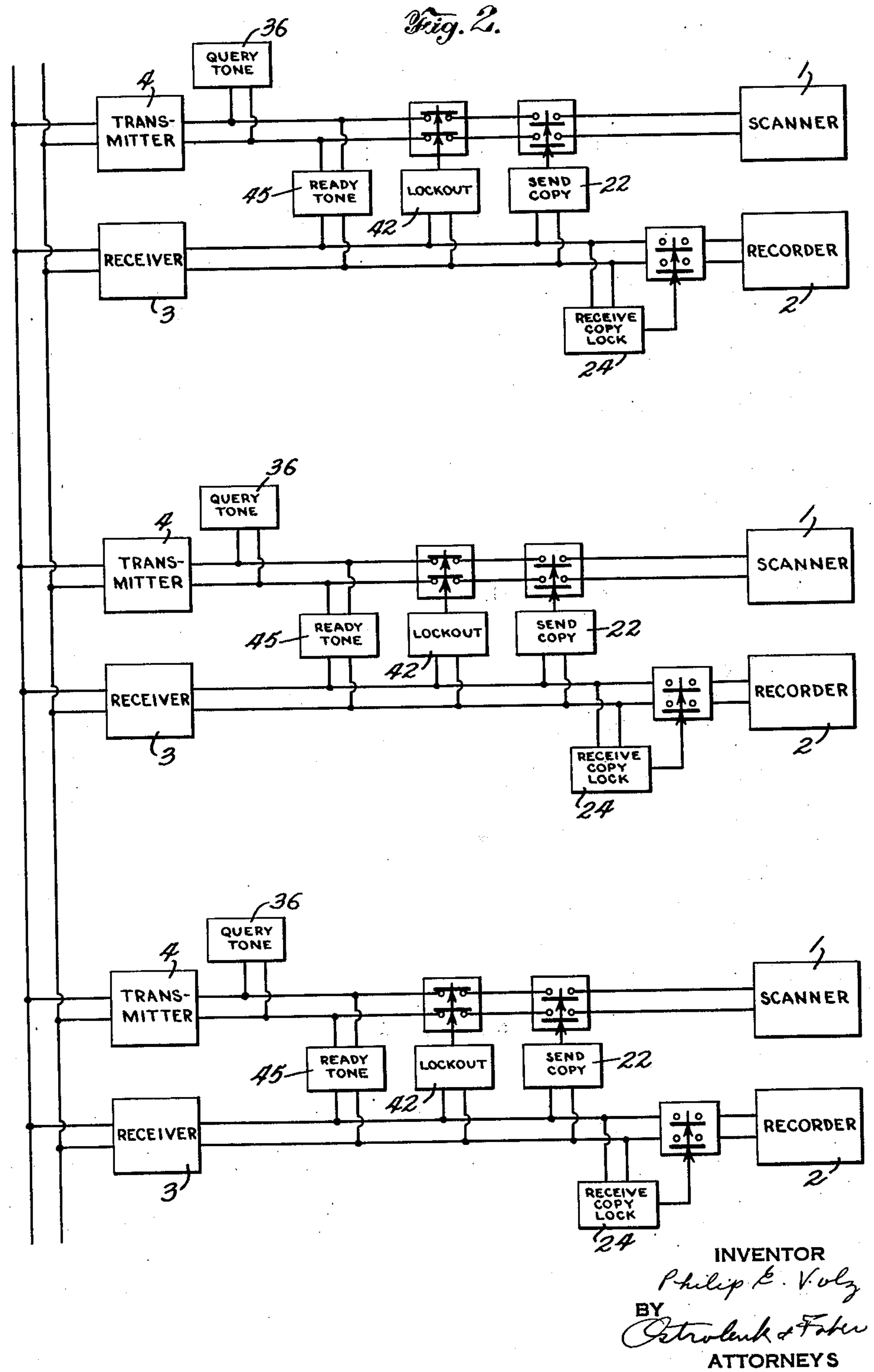

Figure 2 is a schematic illustration of my system showing the seqjuency of operation.

As illustrated in the drawings, the equipment at the station comprises a scanner 1 and a recorder 2. These are shown schematically as they may comprise any of the well-known types of facsimile transmission scanners and receiving recorders, such for example, as illustrated in Patent No. 2,295,572 issued to William G. H. Finch on September 15, 1942. The detailed motor mechanism for operating the scanner and recorder are not shown as they are not part of the inventive concept.

Each station is provided with the usual type of receiver schematically illustrated at 3, which may consist of the usual amplifying circuits for amplifying received signals before impressing them on the recorder. A transmitter schematically illustrated at 4 modulates and amplifies the transmitted signal for transmission to a remote station. The remaining apparatus will be better understood from the description of operation which follows.

Assume that it is desired to transmit information to a designated receiving equipment. The information which may be in the form of a pictorial record in the particular illustration here employed is loaded on the scanner 1 in a manner well-known in the art and illustrated in the above-identified patent, although it will be apparent that this may in alternative be a perforated or otherwise marked tape or code transmitter.

A selector switch 5 comprising a pair of rotatable brush arms 6 and 7 mounted on a common driving shaft and each adapted to engage individual commutator segments 8 and 9 is set at a commutator contact in accordance with the station or stations to be selected for the reception of the information. A start button shown at 11 is next depressed to momentarily engage its front contact.

If, at this time, the equipment at the station shown is not receiving, an energizing circuit will be completed for the send sequence lock relay 12 over a circuit from ground through the winding of this relay over conductor 14 through the closed contacts of the start key 11 and the closed contacts of stop key 15, over conductor 16, through the closed back contact of the armature 17*a* of received sequence lock 17 (at this time de-energized) over conductors 20 and 21, through the back contact of armature 22*a* of send copy lock relay 22 (at this time de-energized), over conductor 23 and through the back contact of armature 24*a* of the receiver lock relay 24 (at this time de-energized) to the battery.

Relay 12 when energized over the above identified circuit operates its armatures 12*a*, 12*b*, and 12*c* to engage their front contacts. A self-locking circuit is provided for the relay 12 over the back contact of armature 25*a* of the time relay 25 and through the front contact armature 12*a* and over conductor 21 to battery as described above. Simultaneously, an energizing circuit is provided for the time relay 25 over the back contact of its own armature 25 and the front contact of armature 12*a* and thence over the circuit completed for relay 12.

Relay 25 when energized will after an interval of time operate its armature 25a to open the locking circuit of relay 12 and its own circuit, but this will occur only after further operations above described have been completed.

As a result of the energization of relay 12, an energizing circuit is completed for the motor 28 from ground through the motor 28 over conductors 29 and 30 to the front contact of armature 12b to the battery.

As a result, the motor 28 now drives the sequence switch 31 through the clutch mechanism 32 which as designated is engaged when de-energized. The sequence device 31 comprises three cams, 32, 33 and 34. When the cam 33 rotating in the direction shown by the arrow, moves through a predetermined angle, the raised portion of the cam closes the contacts 33a and 33b.

Closing of the contact 33a connects the modulated carrier unit 4 to the station selective calling frequency generator 5 over a circuit from ground through the query-tone generator 36, a selected distributor contact on 8 and brush 6 over line 37 through the front contact and armature 12c, conductor 38, through the contact 33a and over conductor 41 to the input of the transmitter 4. It will be understood that the particular segment which brush 6 engages is connected to the query-tone generator so as to transmit a frequency individual to the desired station. The details of this are well known and require no specific description.

If now the remote station selected by this query-tone is in readiness for operation, that is for receiving a message, it immediately transmits a carrier and a short time thereafter a carrier modulated with a general answering frequency in a manner to be described in more detail hereinafter.

Assuming the reception of such an answering frequency over the receiver 3, an output signal from the receiver 3 is impressed and energizes the lock out relay 42 (at all stations in the system) over a circuit from the output of the receiver 3 over the back contact of armature 43a of the send received relay 43 (at this time de-energized) over the conductors 44 and 45a and 46 to the lock out relay 42 and return. This operation, however, does not occur at the calling station due to the energization of relay 43 over contacts 33b and 42c, so long as contact 33b is closed.

Energization of the lock out relay 42 prevents two equipments from transmitting simultaneously. As will be described in more detail hereinafter, energization of relay 42, completes an energizing circuit for relay 24 at all stations. Inasmuch as relay 12 at each station is energized over the back contact of relay 24, none of the other stations can seize control of the system after one station sends its answering call.

Returning now to the sequence switch 31, on further rotation of the cam, the raised portion of cam 34 will after a predetermined time interval close its contact 34a, thus preparing an energizing circuit for the send copy lock relay 22 at the front contact of armature 45a of ready-tone relay 45. If during the period that the contact 34a is closed, a ready or answering frequency is received, the output of the receiver will complete an energizing circuit over conductor 44 traced above and through the ready-tone filter 48 and through winding 45. The ready-tone filter, here schematically shown, will filter through only the ready or answering frequency and may be of any well-known construction.

Energization of relay 45 now completes an energizing circuit for the send copy lock relay 22 from ground to the windings of its relay over the front contact of armature 45a and through the closed contact 34a to battery. Energization of the send copy lock 22 provides a locking circuit for itself and ground through its winding over the conductors 51 and 54, through the closed contact 53 on the end of the scanner, and through the front contact of armature 22a, conductor 23 to battery, over the back contact of 24a. This locking circuit will maintain the send copy lock relay 22 energized until the complete transmission of the message, at which time contact 53 is momentarily opened by the scanner mechanism.

After an interval of time, the ready-tone signal stops in a manner to be described hereinafter and the relay 45 is de-energized. The scanner transmission circuit had been held open at armature 45b while relay 22 was energized. Now on de-energization of relay 45, the transmission circuit is completed extending from ground through the scanner and its well-known mechanism, over the conductor 56, the front contact of armature 22c, conductor 57, and back contact of armature 45b, conductor 58, and back to the scanner and thence over the conductor 61 to the front contact of armature 43b to the input of the transmitter circuit 4.

The scanner is now in readiness for transmitting information. It will be understood that the circuit above-traced would include the photo-electric cell which is effected by light reflected from the image if a scanner such as illustrated in the patent above referred to is employed or any other electrical means for transmitting the image into electric currents in the case of any other form of scanner. In the case of a tape sender, it would include the contacts controlled by the tape.

A further result of the energization of relay 22 is to open the self locking circuit of the send sequence lock relay 12 at the armature 22a. De-energization of relay 12 opens the start circuit described above, but at this time the motor 28 is still held energized over the contact 32a of the cam 32.

When the answering receiver's carrier stops, the local carrier is immediately impressed on the system over the contacts of the send copy relay 22 and lock out 42 as described above. The sequence switch at the end of one revolution opens the circuit for the motor 28 at the contact 32a and thus resets itself to zero. Transmission, however, continues over the scanner 1 due to the locking circuit provided for the send copy relay 22 as described above until the end of the transmission period.

When the information has been transmitted, the copy send contacts 53 are momentarily opened by any suitable means, such as through mechanical operation by the end of the scanner light-housing and the copy send lock relay 22 is de-energized.

Summarizing the description thus far, when an operator desires to transmit, the sequences of operations are as follows:

*Preliminary operations*

1. Selector switch 5 is pre-set.
2. Start button is closed.
3. Sequence lock relay 12 is energized.
4. Motor 28 is energized.
5. Sequence switch 31 rotates.

*Starting selection signal*

6. A query-tone in station selecting frequency is transmitted.

7. The selected station transmits back an answering signal to lock out relay 42 to prevent other stations taking over the channel.

8. A lock-out relay is energized at all other stations.

9. Relay 45 is energized.

10. Send copy relay 22 is energized.

*Signal communication*

11. Relay 45 is de-energized.

12. Relay 12 is de-energized.

13. Motor 28 is de-energized after re-setting to zero.

14. Relay 42 is de-energized.

15. Communication is carried on.

16. Relay 22 is de-energized at end of communication.

The equipment is now in stand-by position, ready to be called or to have more copy loaded for transmission.

Assuming now that instead of initiating a call, the equipment is called from a remote communication point. The incoming carrier signal modulated with the selective query-tone individual to this particular communication point is received over the receiver 3. The output of the receiver transmits a signal over the back contact of armature 43a and conductors 44, 45, and 46 for energizing the lock out relay 42.

In parallel, a circuit is completed over the conductor 65, through the query-tone filter 66 and query-tone relay 67. It will be noted at this point that in the previous circuit traced for relay 42, relay 67 was not energized because the frequency was not within the range passed by the query-tone filter which is designed to pass only the signal corresponding to the frequency individual to the station shown in this figure.

Energization of the query-tone relay 67 operates its armature 67a to engage its front contact and an energizing circuit is completed for the received sequence lock relay 17 from ground, through the winding of the relay 17, over the conductor 68, and through the armature 67a and its front contact, conductor 69, through the back contact and armature 12a, and thence over the conductor 21, armature 22a, conductor 23, armature 24a to battery. Energization of the relay 17 completes a locking circuit for itself, over its armature 17a, over the circuit traced hereinbefore so that this relay stays locked during the remaining operations to be described hereinafter.

Energization of the received sequence lock relay 17 completes an energizing circuit for the motor 28 over a circuit from ground to the winding of the motor 28, conductors 29 and 71, through the armature 17b and its front contact, over conductor 72 and the armature 42b in engagement with its back contact to the positive side of the battery; this circuit being completed only when the lock out relay 42 de-energizes at the end of the query-tone signal.

It will be noted that when the query-tone signal is first received, relay 42 was energized, thus preventing the energization of the motor 28 at the armature 42b until relay 67 energizes, indicating that the particular received query-tone was individual to this station. The energization of the relay 67 in turn energized relay 17 which locked itself so that now at the termination of the query-tone or de-energization of relay 42, the motor 28 is properly energized.

When now motor 28 rotates, it drives the sequence device 31 through clutch 32 as has been described hereinbefore. When now the cam 33 rotates through a predetermined angle until the elevated portion thereof operates to cause contacts 33a to close, a ready-tone signal is transmitted from ground through the ready-tone generator 75 over the conductor 76, through the front contact and armature 17c over the conductors 77 and 38, through the contact 33a closed and over a conductor 41 to the input of the transmitter 4. This ready-tone signal is transmitted to the remote transmitting point and actuates the send copy lock thereat corresponding to relay 22 in the station being described in the manner previously explained.

On further operation of the sequence switch, the cam 34 closes its contact 34a, and an energizing circuit is thereupon completed for the received copy lock relay 24 over a circuit from ground to the winding of the received copy lock 24, conductors 81, 82, and 83 to the armature 17d and its front contact, over conductors 84 and 85 to the closed contact 34a and to battery.

Relay 24 on energization completes a locking circuit for itself over a circuit from ground to the winding of the relay 24, conductors 81 and 88, through the front contact and armature 42d, over the conductor 89, and through the front contact and armature 24a to the positive side of the battery.

Energization of the received copy lock relay 24 also opens the locking circuit for the received sequence lock relay 17 which thereupon de-energizes, thus opening the circuit for the motor 28 over the armature 17b described above and opening the circuit for the ready-tone generator at contact 17c as described above.

Thus, the received copy lock relay 24 stays locked until contact 34a is opened at the sequence switch. By this time, however, the transmitter at the remote station which initiated operation is sending carrier and the lock out relay 42 is again energized. Accordingly, after the contact 34a is opened, the received copy lock relay 24 continues to be energized over a locking circuit extending from ground to the winding of relay 24, over conductors 81 and 88, through the armature and its front contact 42d and over conductor 89 to the front contact and armature 24a to battery.

The received copy lock relay 24 connects the recorder 2 in circuit at the front contact and armature 24c completing the recording circuit over this contact 24c to the conductor 44, connected through the armature 43a, and its back contact to the output of the receiver 3. That is to say, if the recorder is of the type shown in the above-referred patent, the circuit extending through the recorder to the line 44 is normally broken at 24c and closed when contact 24c engages its front contact.

Alternatively, the circuit for any type of recorder can be normally held open at 24c and closed when this contact is closed.

The sequence device runs until it resets to zero, at which time the cam 32, which up to this point has held its contact 32a closed for maintaining motor 28 operating, opens and the motor is de-energized.

When the remote station transmitter has finished sending copy, its carrier current goes off. The lock out relay 42 is thereupon de-energized, in turn opening the energizing circuit for the received copy lock relay 24, thus disconnecting the recorder from the receiver and the equipment now is in stand-by condition ready to be called or to have copy loaded.

From the above description, the function of the sequence device 31 to prevent possible interference between two transmitters will now be clear.

In transmitting sequence, only a pair of contacts on the lock out 42 are energized. If the start buttons are pushed simultaneously at two different communication stations, both start their send sequence as described above. The probability of both sequence mechanism reaching the point at which cam 33 closes its contacts within a time difference of 20 milli-seconds (approximate relay operation time) is very small. Therefore, the equipment on which cam 33 closes first transmits the query-tone and causes the lock out relay at the other stations corresponding to relay 42 in stations shown to energize.

Energization of the lock out relay 42 completes an energizing circuit for the clutch magnet 32 over the contact 32b and conductor 93 to the front contact and armature 42a and thence over the conductor 14 and armature 25a, armature 12a, conductor 21, armature 22a, conductor 23, and armature 24a as described for relay 12 hereinbefore. This opens the clutch 32 in the other (possible interfering communication station) and the sequency device in that equipment is reset by the spring loaded cam 95.

Now, even though there are two periods during the calling in which both carriers (query equipment and designated receiving equipment) are off, there is no possibility of the sequence device in the possible interfering communication station inching up during these two short intervals to where it would transmit and cause interference, since the sequence equipment of the possible interfering station has been restored in its original position and is thus unable to take control for transmission.

When it is desired to send to all other receivers, the selector switch brush 7 of the switch 9 is set to the call-all position which in the present case is illustrated at the contact 96. The sending and receiving operations are necessarily different from those described hereinbefore.

When the start button 11 is momentarily closed, both the send sequence lock 12 and the call-all lock relay 97 are energized, the former over the circuit described above and the latter over a circuit extending from the ground through the winding of the relay 97, over the conductor 98, contact 96, brush 7, conductor 99, and thence over the circuit, including start contact 11 described for the relay 12 and in parallel therewith.

On operation of the motor 28, the cam 33 closes its contacts and a call-all tone is transmitted from the query-tone generator 36 over the contact 101 engaged by the brush 6 over the circuit already traced. The frequency of the call-all tone is such that it is passed by the filter 106 at each station. In the station shown this will energize relay 107 over a circuit from the output of receiver 3 which will now be obvious.

Energization of the call-all relay 107 closes its armature 107a for completing an energizing circuit over conductor 81 for the received copy lock relay 24. It will thus be noted from the above description that the received copy lock relay 24, may be energized under control of a call-all tone relay 107 or by the operation of the cam 34 depending upon the circumstances under which it is to be energized.

When cam 33 opens, cam 34 closes and through contacts on the call-all lock relay 97 completes an energizing circuit for the send copy lock relay 22, the circuit extending from ground through the winding of the relay 22 over conductor 51, through the armature 97a and its front contact and over conductor 105 and conductor 85 to the contact 24b, conductor 82, armature 107a, to the positive side of the battery.

The send copy lock relay 22 energizes and locks in as described hereinbefore. The send-sequence lock relay 12 and the call-all lock relay 97 release as described hereinbefore. The sequence device 31 resets to zero and copy is now transmitted. At the end of the copy, the send copy lock relay 22 de-energizes as described hereinbefore and the equipment is in stand-by condition.

If the apparatus of the station herein described is receiving in response to a call-all tone, such call-all tone and energizing carrier closes both the lock out relay 42 and the received copy lock relay 24. The received copy lock relay 24 on energization connects the recorder 2 for reception as described above. When the sending station's carrier goes off, the lock out relay 42 de-energizes, which in turn de-energizes the received copy lock relay 24 and the equipment is now in stand-by condition.

Thus, the send received relay system allows the automatic operation and the selected calling to be used either with land lines or radio equipment. When a call-all tone signal is received, the output of the receiver is of a frequency which will pass the call-all tone filter 106 completing an energizing circuit for the call-all relay 107.

The system has been described as used in a facsimile circuit for assisting in the receiving and transmitting functions and the selective calling automatic operation. The system, however, as will now be observed does not require continuous operator attention. The only function of the operator is to load the copy, select the designated receiver and close the start button. As further transmissions are to be sent, substituted recording sheets must be placed in the transmitter and in the receiver.

The advantages of this system will now be apparent to those skilled in the art. Practically no skill is required on the part of the operator, since the operator need only load the copy and initiate automatic operation and need only take away copy which has been received and accordingly can devote his full time to other duties. It will also be obvious that the system will function equally well with code transmission or tape transmission, transmission by recording and any other method where the message is to be transmitted in discreet groups.

Accordingly, I prefer to be bound not by the specific disclosures herein contained, but only by the appended claims.

I claim:

1. In a signalling system including a plurality of stations, a signalling channel interconnecting said stations, each of said stations having a transmitting device for transmitting signals over said channel, a receiving device for receiving signals over said channel, a query tone generator device for generating signals individual to each of the other stations of the system, a selector switch for selecting one of said query tones, a motor driven sequence switch, manually controlled circuit connections for energizing said motor driven sequence switch, circuit connections controlled by said sequence switch for connecting said query tone generator to said signalling channel, first circuit connections for connecting said transmitting device to said signalling channel, second circuit connections for connecting said receiving device to said signalling channel, said sequence switch controlling said first and second circuit connections, a ready tone generator individual to each station, circuit connections including a relay responsive to a received signal for connecting said ready tone generator to said signalling channel, circuit connections including a send copy lock relay responsive to a predetermined individual received ready tone signal for initiating operation of a scanner, a receive copy relay and circuit connections including said receive copy relay for initiating operation of said receive copy relay, a lock out relay, circuit connections including said lock out relay responsive to a predetermined signal from the calling station for locking out all other stations from seizing control of the signalling channel during the signalling of said calling station, circuit connections at each of said stations operative in the event of simultaneous operation of said manual control for said sequence switch for permitting one of said stations to take control and lock out the other of said simultaneously operating stations, and circuit connections controlled by said scanner at the end of scanning operations for de-energizing said motor driven sequence switch.

2. In a signalling system including a plurality of stations, a signalling channel interconnecting said stations, each of said stations having a transmitting device comprising a facsimile scanner for translating images into picture signals for transmission over said channel, a receiving device comprising a facsimile recorder machine for translating received picture signals into pictures, a query tone generator device for generating signals individual to each of the other stations of the system, a selector switch for selecting one of said query tones, a motor driven sequence switch, manually controlled circuit connections for energizing said motor driven sequence switch, circuit connections controlled by said sequence switch for connecting said query tone generator to said signalling channel, first circuit connections for connecting said transmitting device to said signalling channel, second circuit connections for connecting said receiving device to said signalling channel, said sequence switch controlling said first and second circuit connections, a ready tone generator individual to each station, circuit connections including a relay responsive to a received signal for connecting said ready tone generator to said signalling channel, circuit connections including a send copy lock relay responsive to a predetermined individual received ready tone signal for initiating operation of a scanner, a receive copy relay and circuit connections including said receive copy relay for initiating operation of said receive copy relay, a lock out relay, circuit connections including said lock out relay responsive to a predetermined signal from the calling station for locking out all other stations from seizing control of the signalling of said calling station, circuit connections at each of said stations operative in the event of simultaneous operation of said manual control for said sequence switch for permitting one of said stations to take control and lock out the other of said simultaneously operating stations, and circuit connections controlled by said scanner at the end of scanning operations for de-energizing said motor driven sequence switch.

3. In a signalling system including a plurality of stations, a signalling channel interconnecting said stations, each of said stations having a transmitting device for transmitting signals over said channel, a receiving device for receiving signals over said channel, a query tone generator device for generating signals individual to each of the other stations of the system, a selector switch for selecting one of said query tones, a motor driven sequence switch, manually controlled circuit connections for energizing said motor driven sequence switch, circuit connections controlled by said sequence switch for connecting said query tone generator to said signalling channel, first circuit connections for connecting said transmitting device to said signalling channel, second circuit connections for connecting said receiving device to said signalling channel, said sequence switch controlling said first and second circuit connections, a ready tone generator individual to each station, circuit connections including a relay responsive to a received signal for connecting said ready tone generator to said signalling channel, circuit connections including a send copy lock relay responsive to a predetermined individual received ready tone signal for initiating operation of a scanner, a receive copy relay and circuit connections including said receive copy relay for initating operation of said receive copy relay, a lock out relay, circuit connections including said lock out relay responsive to a predetermined signal from the calling station for locking out all other stations from seizing control of the signalling channel during the signalling of said calling station, and circuit connections controlled by said scanner at the end of scanning operations for de-energizing said motor driven sequence switch.

4. In a signalling system including a plurality of stations, a signalling channel interconnecting said stations, each of said stations having a transmitting device comprising a facsimile scanner for translating images into picture signals for transmission over said channel, a receiving device comprising a facsimile recorder machine for translating received picture signals into pictures, a query tone generator device for generating signals individual to each of the other stations of the system, a selector switch for selecting one of said query tones, a motor driven sequence switch, manually controlled circuit connections for energizing said motor driven sequence switch, circuit connections controlled by said sequence switch for connecting said query tone generator to said signalling channel, first circuit connections for connecting said transmitting device to said signalling channel, second circuit connections for connecting said receiving device to said signalling channel, said sequence switch controlling said first and second circuit connections, a ready tone generator individual to each station, circuit connections including a relay responsive to a received signal for connecting said ready tone generator to said signalling channel, circuit connections including a send copy lock relay responsive to a predetermined individual received ready tone signal for initiating operation of a scanner, a receive copy relay and circuit connections including said receive copy relay for initiating operation of said receive copy relay, a lock out relay, circuit connections including said lock out relay responsive to a predetermined signal from the calling station for locking out all other stations from seizing control of the signalling channel during the signalling of said calling station, and circuit connections controlled by said scanner at the end of scanning operations for de-energizing said motor driven sequence switch.

5. In a signalling system including a plurality of stations, a signalling channel interconnecting said stations, each of said stations having a transmitting device for transmitting signals over said channel, a receiving device for receiving signals over said channel, a query tone generator device for generating signals individual to each of the other stations of the system, a selector switch for selecting one of said query tones, a motor driven sequence switch, manually controlled circuit connections for energizing said motor driven sequence switch, circuit connections controlled by said sequence switch for connecting said query tone generator to said signalling channel, first circuit connections for connecting said transmitting device to said signalling channel, second circuit connections for connecting said receiving device to said signalling channel, said sequence switch controlling said first and second circuit connections, a ready tone generator individual to each station, circuit connections including a relay responsive to a received signal for connecting said ready tone generator to said signalling channel, circuit connections including a send copy lock relay responsive to a predetermined individual received ready tone signal for initiating operation of a scanner, a receive copy relay and circuit connections including said receive copy relay for initiating operation of said receive copy relay, a lock out relay responsive to a received signal for locking the associated transmitter from being connected to said signalling channel, circuit connections controlled by said sequence switch for connecting said lock out relay to said signalling channel following the transmission of a query tone signal, circuit connections at each of said stations operative in the event of simultaneous operation of said manual control for said sequence switch for permitting one of said stations to take control and lock out the other of said simultaneously operating stations, and circuit connections controlled by said scanner at the end of scanning operations for de-energizing said motor driven sequence switch.

6. In a facsimile intercommunicating system having a plurality of stations, a signalling channel interconnecting said stations, each of said stations having a transmitter comprising a facsimile scanner for translating images to picture signals for transmission over said channel, a receiver comprising a facsimile recording machine for translating received picture signals into pictures, a motor driven sequence switch, manually operated means for initiating operation of said sequence switch, circuit connections controlled by said sequence switch for transmitting over said signalling channel a predetermined station selecting signal, circuit connections at each of said stations responsive to said station selecting signal for locking the facsimile scanner and the recorder at each of said stations out of operation, one of said circuit connections individual to the calling signal being responsive to said calling signal for transmitting a signal to the calling station indicating its preparedness for the receipt of picture signals and for connecting its associated recorder to said signalling channel for the reception of signals, circuit connections including said sequence switch and responsive to said last mentioned signal for connecting the scanner at said calling station to said signalling channel, and circuit connections operative at the completion of the scanning operation for de-energizing said motor driven sequence switch at the calling station and for disconnecting said calling station control of said signalling channel.

PHILIP E. VOLZ.

REFERENCES CITED

The following references are of record in the file of this patent:

UNITED STATES PATENTS

| Number | Name | Date |
|---|---|---|
| 1,870,997 | Jipp et al. | Aug. 9, 1932 |
| 1,872,842 | Storch et al. | Aug. 23, 1932 |
| 1,902,964 | Liesk et al. | Mar. 28, 1933 |
| 1,923,724 | Griffith | Aug. 22, 1933 |
| 2,088,750 | Kinkead | Aug. 3, 1937 |
| 2,148,435 | Carr | Feb. 28, 1939 |
| 2,177,609 | Boose | Oct. 24, 1939 |